(12) United States Patent
Chorpening et al.

(10) Patent No.: US 7,523,673 B1
(45) Date of Patent: Apr. 28, 2009

(54) IONIZATION BASED MULTI-DIRECTIONAL FLOW SENSOR

(75) Inventors: Benjamin T. Chorpening, Morgantown, WV (US); Kent H. Casleton, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 23 days.

(21) Appl. No.: 11/752,360

(22) Filed: May 23, 2007

(51) Int. Cl.
*G01F 1/56* (2006.01)
(52) U.S. Cl. .................................. 73/861.09
(58) Field of Classification Search ............ 73/861.09, 73/861.15, 861.11
See application file for complete search history.

(56) References Cited

U.S. PATENT DOCUMENTS

| | | | | |
|---|---|---|---|---|
| 3,638,054 A | * | 1/1972 | Honigsbaum | 310/10 |
| 4,127,029 A | * | 11/1978 | Murtin | 73/861.09 |
| 5,263,374 A | * | 11/1993 | Marsh | 73/861.15 |
| 5,701,009 A | * | 12/1997 | Griffiths et al. | 250/356.1 |

* cited by examiner

*Primary Examiner*—Jewel Thompson
(74) *Attorney, Agent, or Firm*—James B. Potts; Brian J. Lally; Paul A. Gottlieb

(57) ABSTRACT

A method, system, and apparatus for conducting real-time monitoring of flow (airflow for example) in a system (a hybrid power generation system for example) is disclosed. The method, system and apparatus measure at least flow direction and velocity with minimal pressure drop and fast response. The apparatus comprises an ion source and a multi-directional collection device proximate the ion source. The ion source is configured to generate charged species (electrons and ions for example). The multi-directional collection source is configured to determine the direction and velocity of the flow in real-time.

12 Claims, 10 Drawing Sheets

IONIZATION BASED MULTI-DIRECTIONAL FLOW SENSOR

CONTRACTUAL ORIGIN OF THE INVENTION

The United States Government has rights in this invention pursuant to an employer-employee relationship between the U.S. Department of Energy and the inventors.

BACKGROUND OF THE INVENTION

1. Field of the Invention

One or more embodiments of the present invention relate generally to monitoring systems. More specifically, embodiments of the present invention relate to a multi-directional sensor used to monitor flow in hybrid power generation systems for example.

2. Background of the Invention

The U.S. Government has invested in fuel cell technology to advance power generation systems. One significant area of research includes systems in which a fuel cell is combined with another power generation device (a turbine for example) to create a hybrid system that combines the advantages of the two stand-alone systems, resulting in a high fuel-to-electricity conversion efficiency.

Such hybrid systems may be configured in several different ways. An exemplary hybrid system, generally designated 10, is illustrated in FIG. 1. The exemplary system 10 uses one or more high temperature fuel cells 12 (solid oxide or molten carbonate fuel cells for example). A compressor associated with a turbine 16 pressurizes an air stream 18. The pressurized air contacts or otherwise communicates with the fuel cells 12 by means of a recuperator 20, valve 22 and a fuel cell air conduit 24. When fuel 26 (natural gas for example) is provided to the fuel cells 12, the resultant electrochemical reactions in the fuel cells 12 generate electrical energy, subsequently used to power a load 28. It is this supply of pressurized/oxygenated fluid to the fuel cell that increases both fuel cell efficiency and power density of the system 10. In at least one embodiment, the recuperator 20 is illustrated venting to a stock 30. For improved control of the system, some of the air may be routed through conduit 27, bypassing the fuel cell.

High-pressure, high temperature effluent of the fuel cells 12 connects or is otherwise communicated to the turbine 16 an via a post combustor 32 (i.e. an oxidizer) and one or more return loop conduits 25. The pressurized effluent expands in the turbine 16, enabling the compressor 14 to operate, in addition to providing more electrical energy to service the original load 28 or a plurality of loads 28, 34. This use of waste heat or pressurized effluent produces electricity, rather than serving solely as a source of a thermal load. This pressurized effluent utilization enhances the fuel-to-electricity efficiency of the illustrated system 10.

Burners are used as the primary or auxiliary energy source in the turbine portion of the hybrid system. These burners usually have one or more sources or inlets using one or more hydrocarbon based fossil fuels such as, for example, natural gas, liquefied petroleum gas, and liquid hydrocarbon-based fuels. Accurate monitoring and control of such combustion process is very important to ensure the efficient and safe operation of the hybrid systems.

There is a growing need to both measure and control the behavior of flames, the combustion process in the gas turbine combustors and the airflow in the hybrid system. Numerous apparatus, systems and methods are available for measuring flames in burners, and in particular gas turbines. For example, commercially available UV flame detectors may be used to monitor the status (flame on or off) of a flame. Alternatively, a photocell may be used as the detector. However, these types of flame monitoring devices are directed to monitoring the flame and not airflow.

Endoscopes may also be used to visually inspect flames. However, they are generally complicated and expensive pieces of equipment that require careful maintenance. Introduction into high temperature burners or turbines requires external cooling and flushing means. Further, endoscopes are not suitable for monitoring flow direction and velocity in the system.

Differential pressure sensors or transducers have previously been used to monitor flow in systems. However, pressure drop sensors generally only operate in one direction, and are slow to respond to change. Furthermore, differential pressure sensors often require large differentials to provide accurate readings. This pressure drop usually results in a significant drop in total system pressure that is unrecoverable; therefore, a loss in system efficiency occurs.

Alternatively, vane type sensors may be used to monitor flow in the system. Generally, such vane type sensors are even more limited than pressure drop sensors, in that they only monitor flow direction, and not velocity.

Hot wire anemometers use temperature disturbance in the flow to detect velocity and direction of flow. However, hot wire anemometers may be confused by temperature fluctuations, and are therefore considered unreliable for applications with varying temperature, and are limited in their temperature range of operation.

Flame Ionization

Flame ionization detectors (FID) commonly used in gas chromatography use the electrical properties of flames to determine very low concentration of hydrocarbons. Their response has been shown to be proportional to the number of methyl radicals produced in the process of oxidation of a hydrocarbon molecule, and the concentration of the specific hydrocarbon. A fraction of these methyl radicals are chemically ionized through the reaction.

$$CH + O \rightarrow CHO^* \rightarrow CHO + e-$$

where CH is the methyl radical and O is atomic oxygen produced in the chemical reactions in the flame. The ionization produced is then detected by the FID.

FID is considered a carbon counting device. The FID response is proportional to the number of carbon atoms or the concentration of hydrocarbons in the sample. Cheng et al., *Prog. Energy Combustion Science,* vol. 24, 1998, pp. 89-124, describes the equation for the current measured in the FID as

$$i = r(C_nHm)Q$$

where r is the charge per mole of hydrocarbon, $(C_nH_m)$ is the molar concentration of the hydrocarbons, and Q is the volumetric flow rate. The linearity of the FID measurements depends on the consistency of charge collection. The Cheng reference is incorporated herein by reference.

Other investigations have shown the feasibility of using flame ionization for monitoring and control of internal combustion (IC) engines. Eriksson et al., Ionization Current Interpretation for Ignition Control in Internal Combustion Engines, L. Eriksson, and L. Nielsen, Control Engineering Practice, Vol. 5 (8), 1997, pp. 1107-1113, demonstrated the feasibility of using in cylinder ionization-current measurements to control IC engine spark advance. Watterfall et al., "Visualizing Combustion Using Electrical Impedance Tomography," Chemical Engineering Science, vol. 52, Issue 13, July 1997, pp. 2129-2138, demonstrated using impedance topography to visualize combustion in an IC engine.

Commonly assigned U.S. Pat. No. 6,887,069 issued May 3, 2005, and incorporated herein by reference in its entirety, describes a real time combustion-control-and diagnostics sensor (CCADS) which employs flame ionization to monitor combustion processes. CCADS is capable for detecting flow reversal in only one direction. CCADS is not capable of measuring velocity in either the forward or reverse direction.

A need therefore exists in the art for an apparatus and method for measuring flow velocity and direction in a system. The apparatus and method should be capable of operating in high temperature environments, with minimal pressure drop and fast response to directional change.

SUMMARY OF THE INVENTION

An object of the present invention is to provide a method, system and apparatus to monitor fluid flow that overcomes many of the disadvantages of the prior art.

Another object of the invention is to provide a system for conducting real-time monitoring of flow (airflow for example) in a system (a hybrid power generation system for example). A feature of the system is the incorporation of multi-directional flow detectors. An advantage of this system is that flow direction and velocity are measured in real time.

Yet another object of the present invention is to provide a system to measure airflow in a plurality of directions. A feature of the invention is its solid state characteristics whereby no mechanical activation of the system or its parts/components is required. An advantage of the system is that it measures fluid flow direction and velocity with minimal pressure drop in real time. The inventors found that minimization of pressure drop in the measurement process enables greater energy efficiency in systems having fluid flow, such as hybrid power generation systems.

The apparatus comprises an ion source and a multi-directional ion collection device proximate the ion source. The ion source is configured to generate charged species (electrons and ions for example). The multi-directional collection device is configured to determine the direction and velocity of the flow of charged moieties in real-time.

One embodiment relates to an apparatus for real-time monitoring of fluid flow. In at least one embodiment, the system operates at from about 100° F. to about 2000° F.

Another embodiment relates to a power generation system comprising at least one power generation device, a load coupled to the power generation device, and an apparatus communicating with at least the power generation device, the apparatus configured for real-time monitoring of airflow in the power generation system. The apparatus comprises an ion source, a multi-directional collection device and a detector. The ion source is configured to generate electrons and ions. The multi-directional collection device is located proximate the ion source and configured to collect the electrons and ions. The detector communicates with at least the ion source and the multi-directional collection device, and is configured to measure current in the multi-flow directional collection device and determine at least a direction and velocity of the airflow.

Still another embodiment relates to a method for monitoring airflow in a system using a multi-directional collection apparatus. The method comprises generating a charged species using a source in the multi-directional collection apparatus and completing an electrical circuit between at least the charged species and at least one electrode in the multi-directional collection apparatus. The method further comprises measuring a current in the at least one electrode and determining at least a direction and velocity of the airflow using at least the measured current.

Yet other embodiments relate to the ion source comprising at least one of a flame, a burner, an electrode, a sparking device, a radioactive source and a plasma generator. The electrode may comprise a plurality of electrodes, selected from the group comprising linear electrodes, button electrodes, ring electrodes and spot electrodes.

DESCRIPTION OF THE DRAWING

Embodiments together with the above and other objects and advantages may best be understood from the following detailed description of the embodiments illustrated in the drawings, wherein.

DETAILED DESCRIPTION OF THE INVENTION

Figure 1:
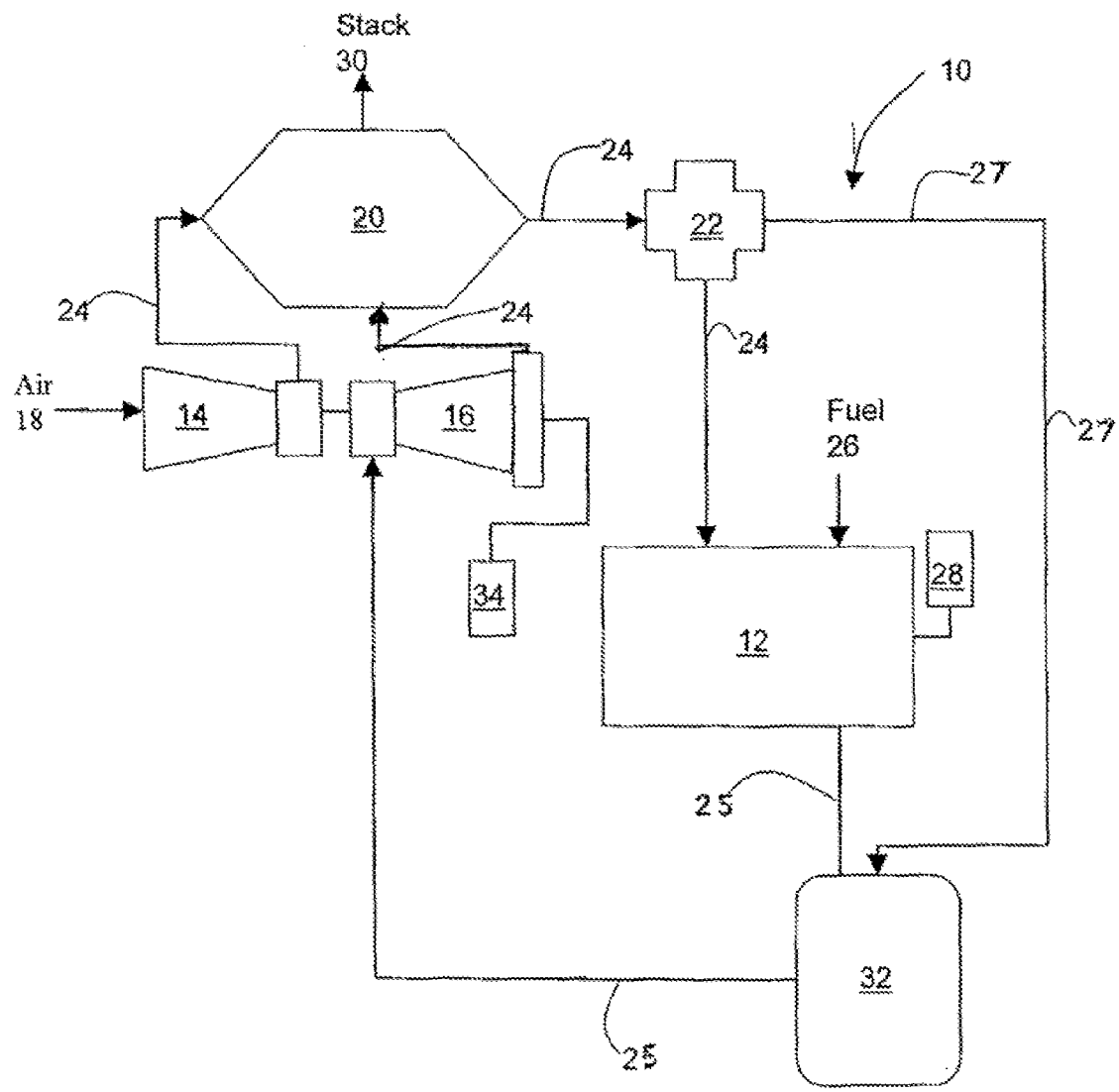
FIG. 1 depicts a schematic diagram of an exemplary hybrid power generation system.

The invention provides a power generation system comprising at least one power generation device, a load coupled to the power generation device, and an apparatus communicating with at least the power generation device, the apparatus configured for real-time monitoring of airflow in the power generation system. The apparatus comprises an ion source, a multi-directional collection device and a detector. The ion source is configured to generate electrons and ions. The multi-directional collection device is located proximate the ion source and configured to collect the electrons and ions. The detector communicates with at least the ion source and the multi-directional collection device, and is configured to measure current in the multi-directional collection device and determine at least a direction and velocity of the airflow.

A myriad of ions are detected with the invented sensor. Those ion types depend upon the effluent stream and the ion source. Thus, flame-based ion source produce $CHO^+$, $H_3O^+$ among others. Nonflame sources, such as plasmas, produce $Na^+$, $K^+$ and other metal ions. Negatively charged ions are also suitable.

Embodiments of the invention enable measuring flow velocity and direction (airflow for example) in a system with minimal pressure drop. Additionally, embodiments of the invention provide for a fast response to directional change. In one embodiment of the invention, a uniform voltage bias is provided to a sensor. A charged species entrained in a fluid is generated that completes an electrical circuit between the sensor and ground, so that at least the flow direction and velocity of fluid flow may be determined. The term "fluid" in this specification comprises a myriad of configurations, including solely gas or solely liquid phase effluent, combinations of gas and liquid phase effluent, gas phase effluent with solids entrained therein, liquid phase effluent with solids entrained therein, and combinations thereof.

Embodiments of the invention use a flame and a plurality of electrodes (e.g. four electrodes with two in each flow direction) to collect electrons and ions (i.e., charged species). The electrodes are provided with a uniform voltage bias, and the flame generates a charged species that completes an electric circuit between the electrodes and ground. Each of the electrodes, and therefore a plurality of such electrodes, are electrically isolated from electrical ground. From the current that passes through the electrodes, and their position relative to the flame source, the direction and velocity of the flow may be determined.

It should be appreciated that, while a flame is discussed as a charged species generator, other ion generation sources are contemplated including, but not limited to, sparking devices, radioactive sources, electrodes, burners and plasma generators. Furthermore, while four electrodes (two in each flow direction) are discussed in the illustration, more are contemplated. For example, embodiments are contemplated wherein three or more electrodes are placed in each direction of flow. Additionally, a plurality of electrodes may surround the flame, forming a ring, a plurality of rings, or some other suitable pattern used to collect electrons and ions and therefore determine fluid flow in one, two or any possible direction. In one embodiment, the electrodes are symmetrically arranged about the flame.

Figure 2:
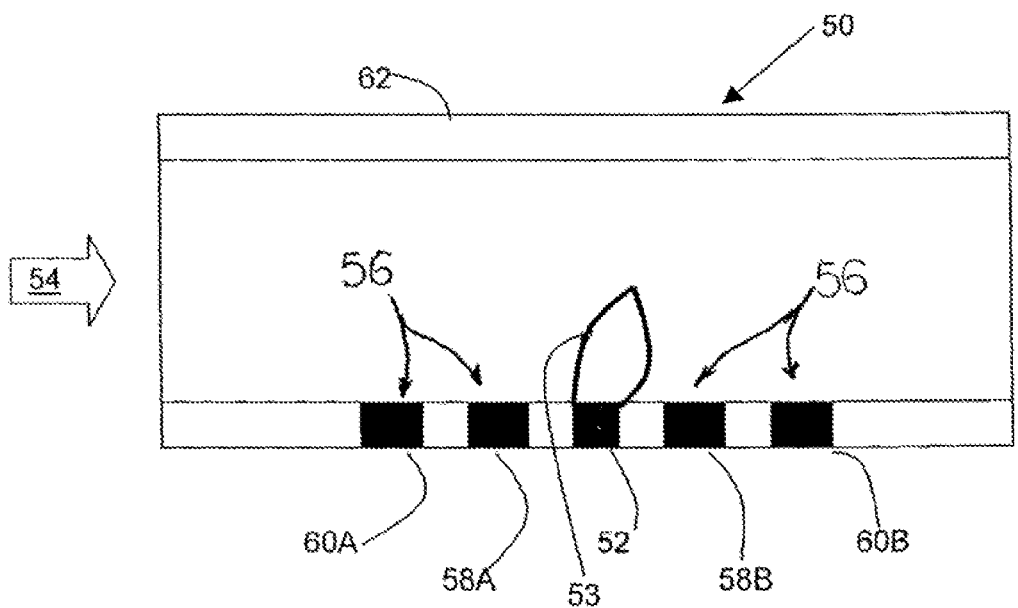
FIG. 2 depicts a schematic representation of a bi-directional flow sensor in accordance with features of the present invention.

FIG. 2 illustrates one embodiment of an ion or ionization source based bi-directional flow sensor, generally designated 50, in accordance with the present invention. The flow sensor 50 is adapted to be placed in any suitable position in a hybrid power generation system such as the system described supra. For example the flow sensor 50 is adapted to be placed or positioned in one or more conduits 24 or tubes of the hybrid system, said conduits provided to transport compressed air to the recuperator, or compressed air from the recuperator to the fuel cell, or compressed air to a combustor, or exhaust gas emanating from a power system, an internal combustion engine, or said conduits 25 provided to transport exhaust gas from a fuel cell, and combinations thereof.

In the illustrated embodiment, the flow sensor 50 comprises an ion or flame source 52 adapted to measure flow 54 in a bi-directional manner. Flow sensor 50 further comprises a multi-directional collection device or electrodes 56 (two electrodes in each flow direction for example). In FIG. 2, the multi-directional collection device or electrodes 56 comprises one or more sets of axially spaced electrodes, a first plurality of electrodes 58A and 58B, and a second plurality of electrodes 60A and 60B. In the illustrated embodiment, the electrodes 56 are axially spaced and electrically isolated electrodes embedded in a wall 62 (of a conduit or tube similar to that provided previously) and may comprise ring-, spot-, button- (same shape but larger than spots), arc-, square-, linear- or other shaped-electrodes. It should be appreciated that while two electrodes 56 in each direction are illustrated, one, two or more electrodes 56 (i.e. a plurality of electrodes) at upstream and downstream positions also are contemplated.

In situations where the invented flow detectors are to be placed in conduits in which presence of a flame detector is either unsupportable or undesirable (such as when N2 or CO2 is the primary constituent of the fluid stream,) the ion generators employed are of the non-sparking or non-flame variety, including, but not limited to, a radioactive source, an electron gun, a plasma generator and combinations thereof.

The electrodes 58A, 58B, 60A and 60B are provided with a uniform voltage bias, (which is to say all electrodes are maintained at the same voltage) The flame 53 acts as an ion source, generating charged species which complete an electric circuit between one or more of the electrodes 58A, 58B, 60A and 60B and ground 61. The direction and velocity of airflow 54 may be determined by comparing the current that passes through the electrodes 58A, 58B, 60A and 60B, and each of their positions relative to the ion source. The speed of the airflow 54 in one or both directions may be determined in real time by observing the voltage ratio 58A/60A or 58B/60B (depending on the direction of airflow).

A detector device or circuit, with an equal-potential bias voltage, is used to measure the current passing through one or more of the electrodes 58A, 58B, 60A and 60B. In one embodiment, each electrode is electrically isolated and has a separate detector circuit, with an equal-potential voltage, so the current measured through each electrode is independent of any current measured through any other electrode.

Figure 3:
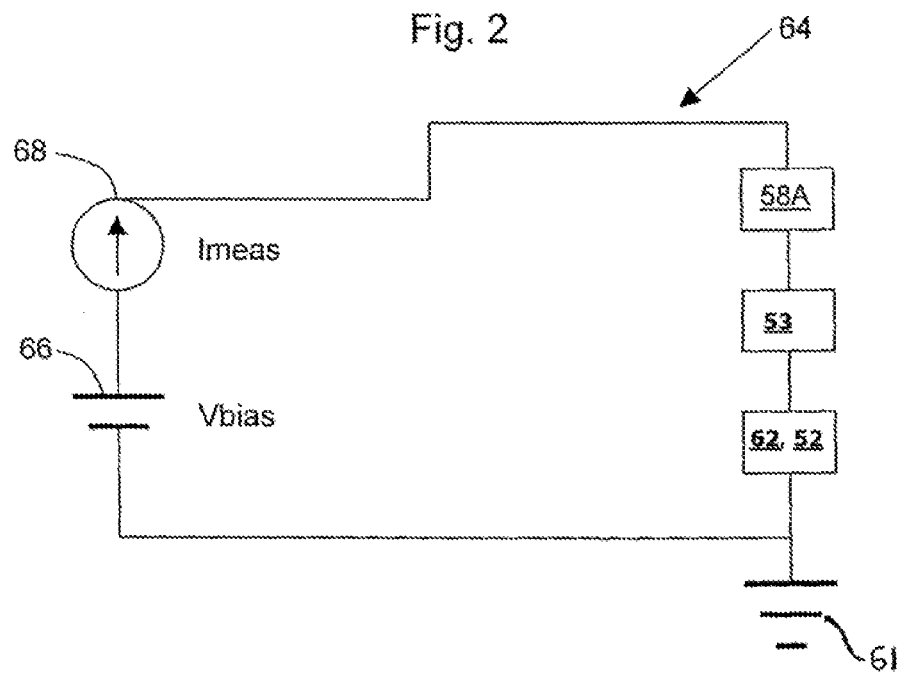
FIG. 3 depicts a schematic representation of a detection circuits in accordance with features of the present invention.

A suitable typical detector circuit is depicted in FIG. 3. This circuit, generally designated 64, provides or supplies a bias voltage 66, uniformly biasing each of the electrodes (electrode 58A is depicted for illustration purposes). The circuit measures the current conducted or passing through the electrode 58A and ground using, for instance an ammeter (Imeas) 68. In this embodiment, the circuit 64 is completed through the electrode 58A, flame 53 and burner 52 and/or wall 62.

As illustrated, the circuit 64 is completed through at least a flame 53 and a burner 52, and/or wall 62, which are at reference ground potential. The configuration illustrated in FIG. 3 provides a voltage output proportional to the amount of current conducted through the one or more electrodes. It should be appreciated that, while only one flow sensor 50 is illustrated, two or more sensors 50 are contemplated. Furthermore, and as noted supra, one or more flow sensors 50 may be positioned in a plurality of conduits or other fluid transport means in the system.

Figure 4:
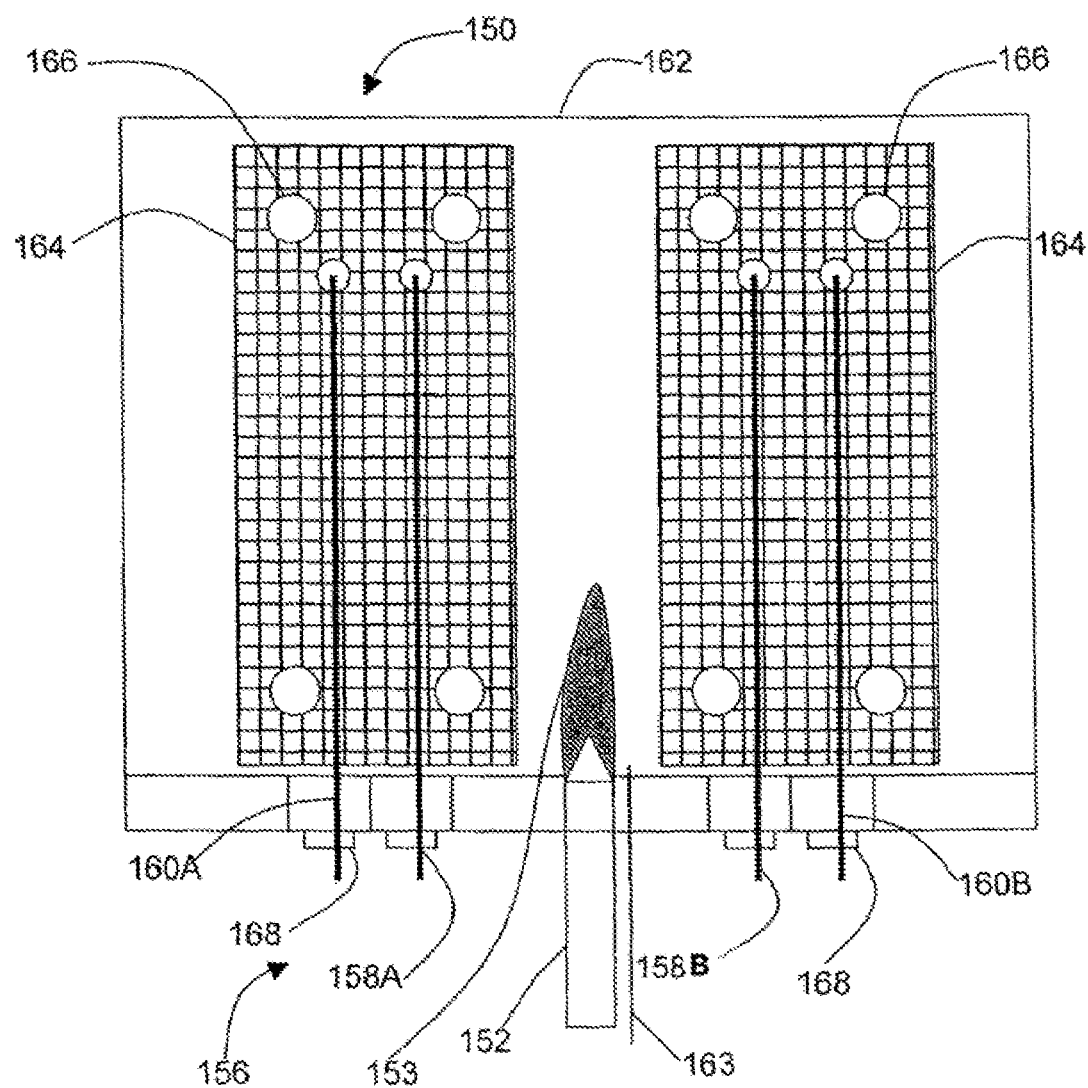
FIG. 4 depicts a front elevational view of a flow sensor similar to that illustrated in FIG. 2 using linear electrodes in accordance with features of the present invention.

FIGS. 4 and 5 depict front and side elevational views of a bi-directional flow sensor, generally designated 150, similar to the flow sensor 50 illustrated in FIG. 2. The sensor is adapted to be placed in any suitable position in the hybrid system described previously. In the illustrated embodiment, the current collection devices or electrodes 156 (two in each flow direction for example) of flow sensor 150 comprise a plurality of linear electrodes, a first set or plurality of electrodes 158A and 158B and a second set or plurality of electrodes 160A and 160B. FIGS. 4 and 5 further illustrate an ion or flame source 152 adapted to measure flow 154 in a bi-directional manner (best viewed in FIG. 7).

FIG. 4 further depicts an ignition wire 163 (coupled to an ignition source not shown) used to energize the ion source, e.g. igniting a flame 153. It is contemplated that one or more insulation sheets 164 may be used to secure the sensors to a wall 162 of the system conduit by means of one or more securing devices. More specifically, two sheets 164 comprised of Mica or other electrically insulating material (e.g., thermoplastic or ceramic) are illustrated, where electrodes 158A and 160A are positioned on and connected to one sheet. Concurrently, electrodes 158B and 160B are positioned on and connected to the other sheet. It should be appreciated that while only two insulating sheets and four electrodes are illustrated and discussed, different numbers and arrangements are contemplated. Furthermore, while FIG. 4 depicts the flow sensor attached to a wall of a conduit, the flow sensor can also be transportable so as to be repositioned throughout the length of the conduit, or moved to different conduits. The electrodes are positioned as a group along a section of a longitudinally extending surface of the conduit. Typically, the conduits are all placed on the same side of the conduit.

Figure 5A:
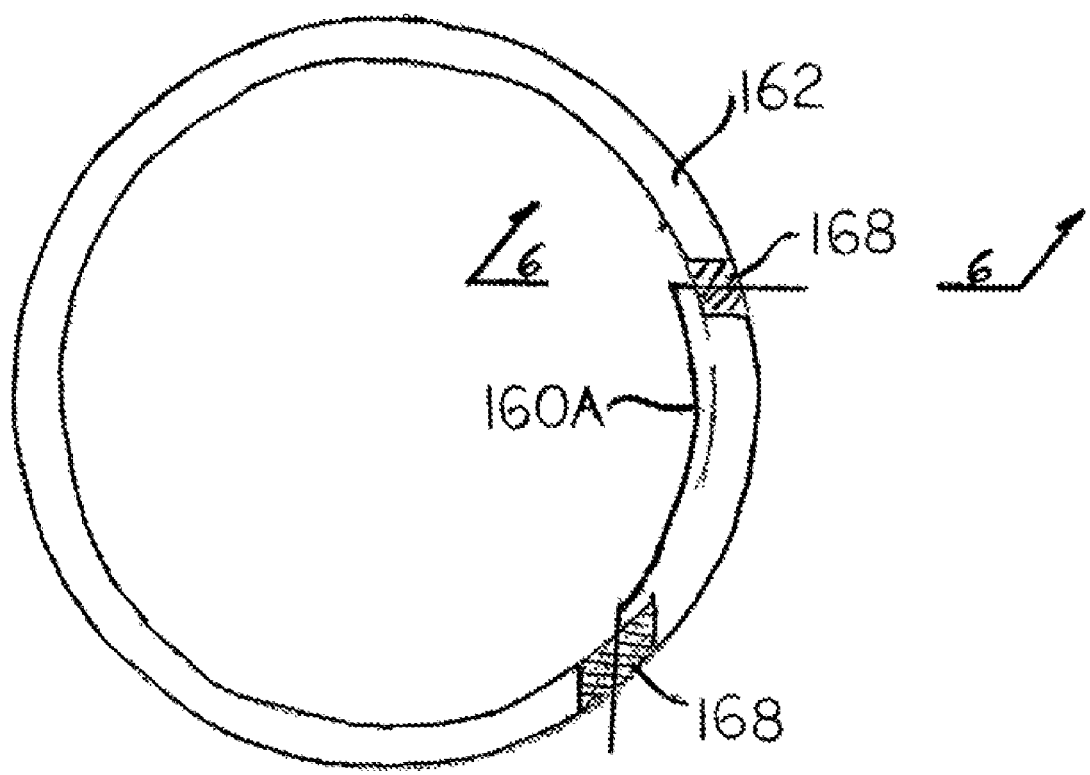
FIG. 5A depicts a side elevational view of a contoured flow sensor, in accordance with features of the present invention.

In one embodiment, as depicted in FIG. 5A, the sensor can be configured (i.e. curved) to mimic the cross-sectional shape of the conduit. FIG. 5A depicts placement of the sensor in a tubular conduit. In such a configuration, an insulating sheet 164 is not required so long as the electrodes are retained to avoid contact with the wall 162. One suitable means for retention is through the use of an electrode wire gauge having suitable diameter, and therefore rigidity, to withstand flow pressures and other inner-conduit rigors.

Figure 5B:
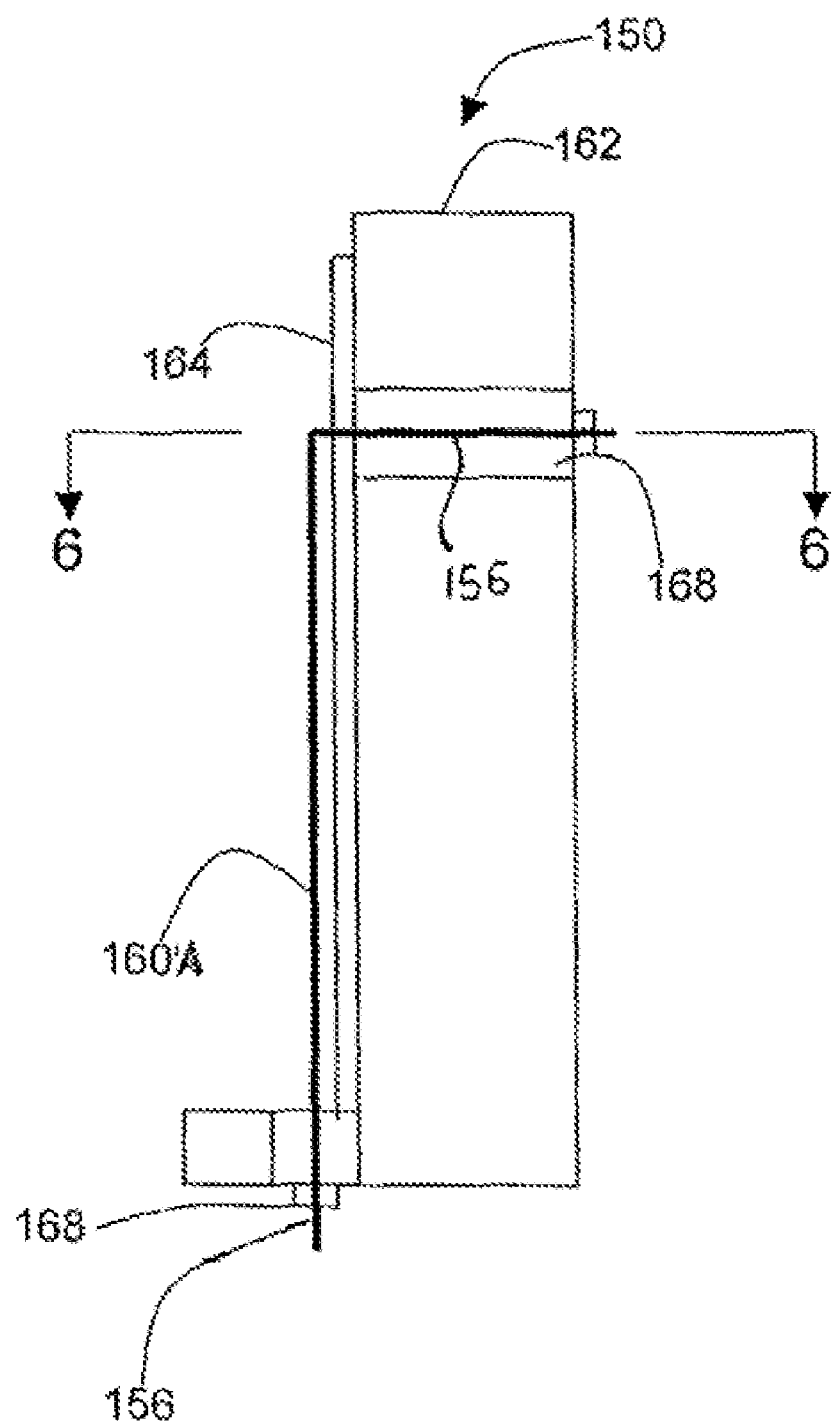
FIG. 5B is a side elevation view of a flow sensor positioned in a conduit having a cross section containing corners, in accordance with features of the present invention.

Insulating sheets 164 are illustrated as connected or coupled to the wall 162 by one or more securing devices. In FIGS. 4 and 5B, screws 166 (pan head or socket screws for example) are used to secure the sheets 164 to wall 162. Further, the electrodes 156 are shown running through wall 162. In at least one embodiment, a retaining ring 168 (best viewed in FIG. 6 which is a view taken along line 6-6 in FIG. 5B) is shown removably received in a threaded aperture of the wall. The ring serves to position and secure the linear electrode 156 in wall the 162 in an electrically isolated manner. It should be appreciated that two or more retaining rings 168 are associated with each linear sensor 156. (See FIG. 5B). As illustrated in 5B, the wall 162 could be part of a square-cross section conduit (or other type cross-section, depicting angular corners). The wall 162, instead of the insulator sheet 164, could serve as a means for supporting the sensor, particularly when the conduit comprises non-electrically conductive material.

Figure 6:
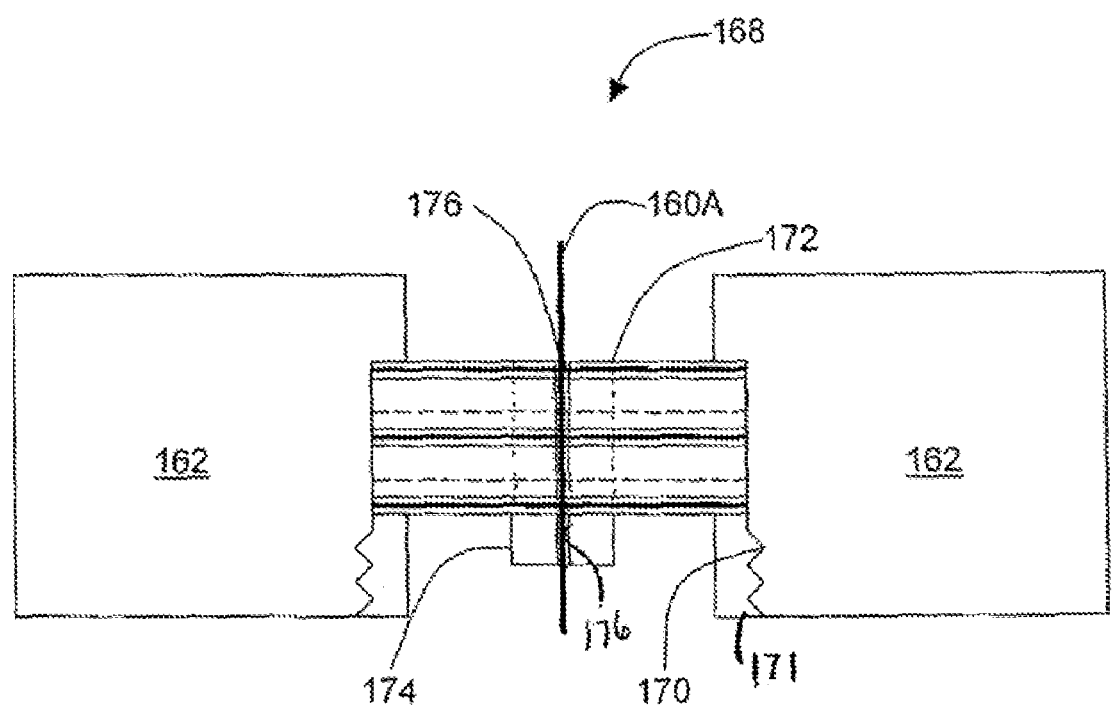
FIG. 6 is a view of FIG. 5B taken along with lines 6-6, in accordance with features of the present invention.

FIG. 6 illustrates one embodiment of the retaining ring 168 used with the linear sensor 156 (linear electrode 160A is shown for illustrative purposes only). In the illustrated embodiment, the retaining ring 168 is shown positioned and secured in the wall 162 (using threads 170 for example). The retaining ring 168 comprises an insulator 172 (a ceramic insulator for example) and an electrode retainer 174. The ceramic insulator 172 is shown having an aperture or passage 176 formed therein and adapted to receive the retainer 174 coaxially aligned with the insulator and through which the linear electrode 160A passes. The electrode retainer 174 is used to secure the linear sensor 156 as is passes through the insulator 172. The "threaded" insulator retaining ring, 171, holds the insulator 172 in place.

Figure 7:
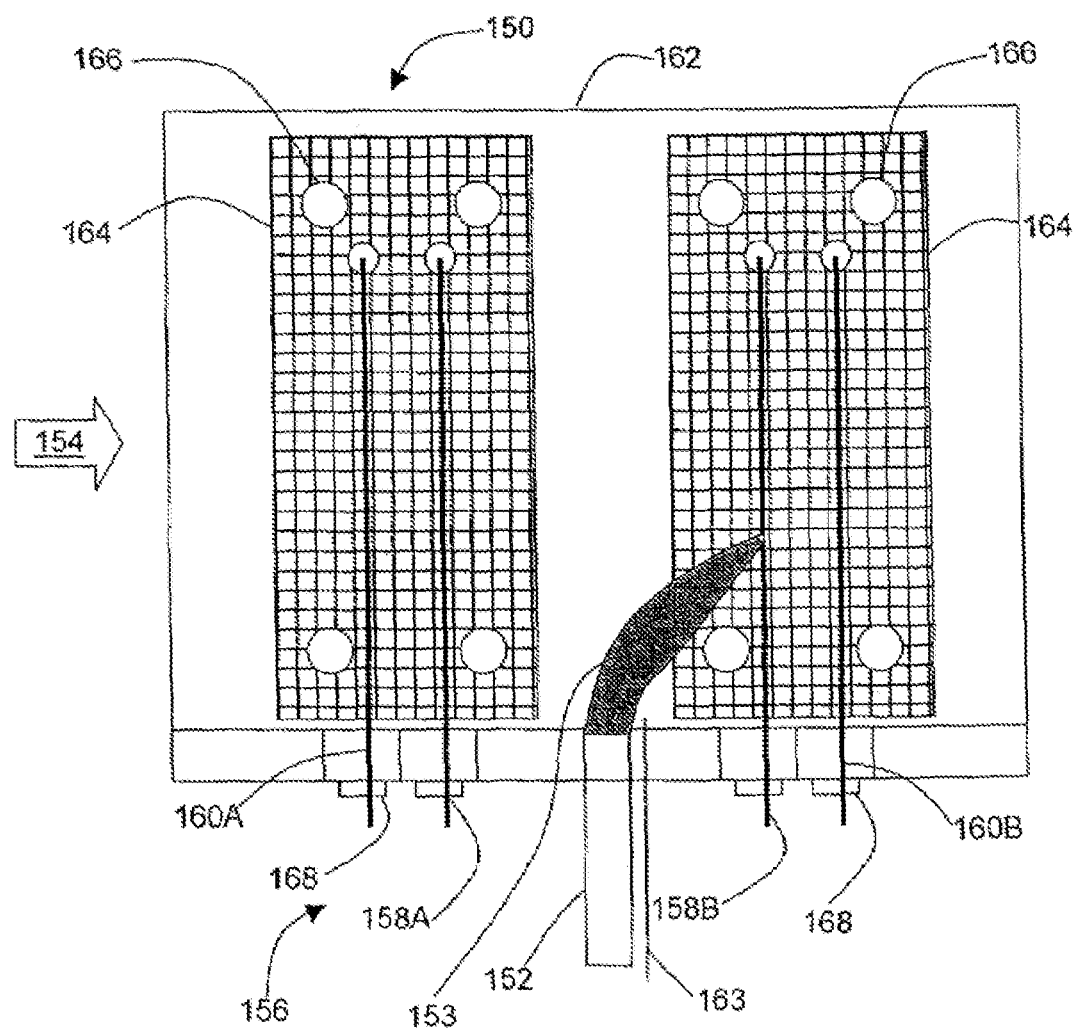
FIG. 7 depicts a front elevational view of a flow sensor of FIG. 4 in operation in accordance with features of the present invention.

FIG. 7 depicts a front elevational view of the bi-directional flow sensor 150 in operation in accordance with one embodiment of the present invention. Airflow (depicted by arrow 154) causes the flame 153 to bend or move in the direction of flow. The flame 153 movement causes electrons and ions or other charged species to move in the downstream direction. The electrons and ions or other charged species moving in the downstream direction complete an electric circuit between one or more linear electrodes 156 and the burner 152, and grounded wall 162. In this example, the electric circuit is completed between electrodes 158B and 160B and ground. In other words, electrodes 158B and 160B collect more current than electrodes 158A and 160A. The greater current is due to both the transport mechanisms of airflow 154 preferentially transporting the electrons and ions or other charged species downstream to electrodes 158B and 160B, and the decreased separation between flame 153 and electrodes 158B and 160B, which decreases the recombination of electrons and ions or other charged species that could otherwise occur prior to encountering electrodes 158B and 160B. This decreased recombination of electrons and ions or other charged species increases the sensitivity of the flow sensor.

The direction and velocity of airflow 154 may then be determined by measuring the current that passes through one or more of the electrodes 158B and 160B and their position relative to the burner 152. The speed of the airflow is determined using the current ratio of 158B/160B. The current is measured and converted to a proportional voltage which is analyzed to compare current strengths at various electrodes within an electrode grouping. In this instance, a first electrode 158B is in closer spatial relationship to the ion source than a second electrode 160B. While linearly positioned near the ion source, the electrodes can be arranged such that one of the electrodes is positioned further downstream than a first electrode closest to the ion source.

A detector circuit, with an equal-potential bias voltage, is used to measure the current passing through one or more of the electrodes 158B and 160B. In one embodiment, each electrode has a separate detector circuit, with an equal-potential voltage, so that the current measured through each electrode is independent of any current measured through any other electrode. An example of a typical detector circuit is described previously and illustrated in FIG. 3.

As illustrated in FIG. 7, the circuit is completed through the electrodes 158B and 160B, the flame 153, and the burner 152, which is grounded.

Alternatively voltage comparisons between different groups of electrodes colinearly arranged along a conduit are enabled.

Figure 8:
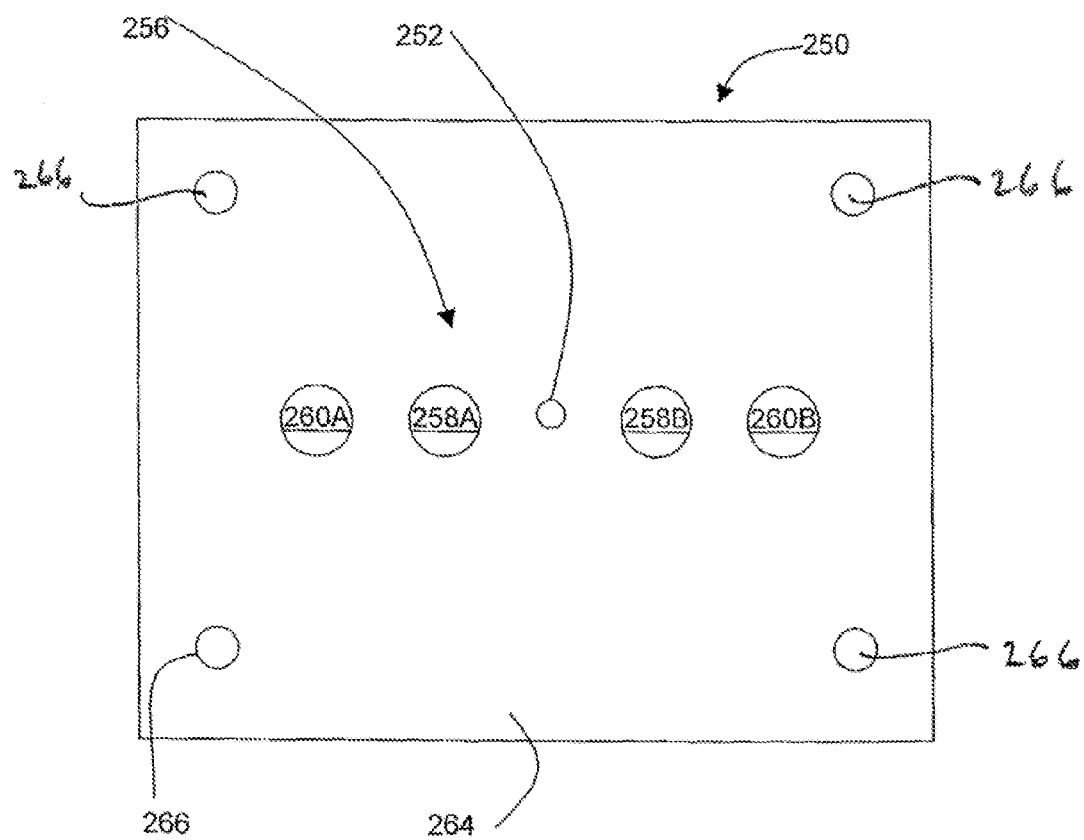
FIG. 8 depicts a plan view of a flow sensor using button-shaped electrodes, in accordance with features of the present invention.

FIG. 8 depicts a top plan view of a bi-directional flow sensor, generally designated 250 using button-shaped electrodes 256 in accordance with one embodiment of the present invention. The sensor is adapted to be placed in any suitable position in the hybrid system described previously. In the illustrated embodiment, the current collection devices or electrodes 256 (two electrodes in each flow direction for example) of flow sensor 250 comprise a plurality of button electrodes, first electrodes 258A and 258B and second electrodes 260A and 260B positioned or secured in a burner plate 264. All of the electrodes are positioned along the same straight line. The ion source also resides on the line and is positioned intermediate a first and second plurality of electrodes. FIG. 8 further illustrates burner 252 adapted to generate electrons and ions or other charged species.

The burner plate 264 is illustrated connected or coupled to the wall (not shown) by one or more securing devices. In FIG. 8, screws 266 (pan head or socket screws for example) are used to secure the plate 264 to the wall. It should be appreciated that, while the illustration depicts the flow sensor attached to a wall of a conduit, the flow sensor could be integrated into the wall of the conduit.

Figure 9:
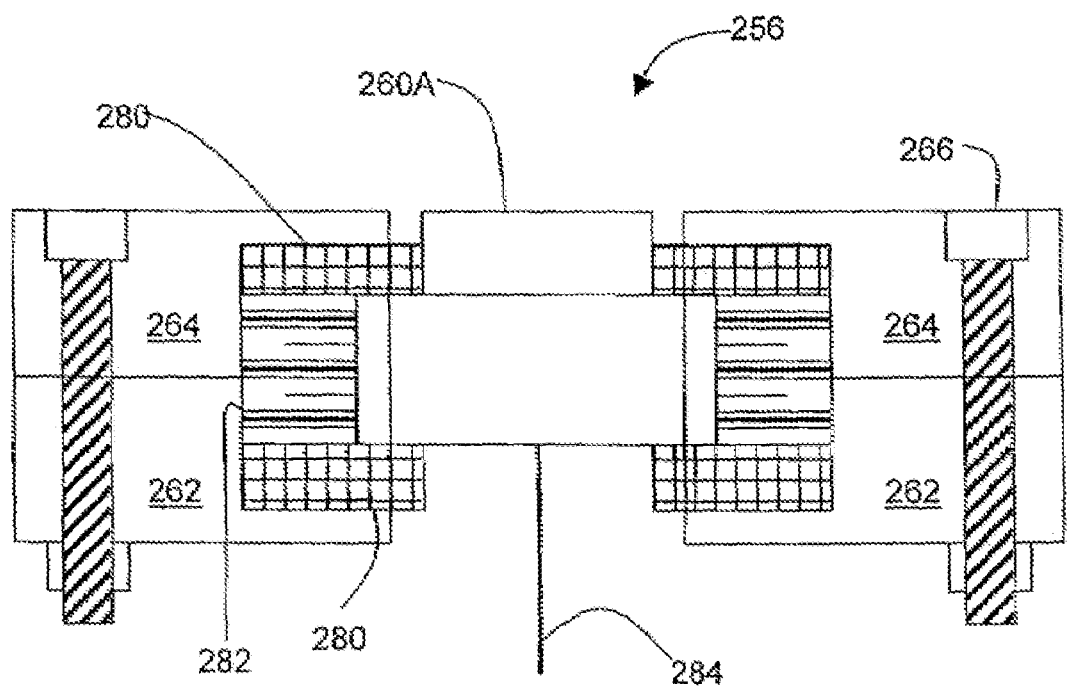
FIG. 9 depicts a cross-sectional view of one of the button-shaped electrodes depicted in accordance with features of the present invention.

FIG. 9 depicts a cross-sectional view of one of the button-shaped electrodes 256 (electrode 260A is shown for illustrative purposes only) mounted to and electrically isolated from burner plate 264 and/or wall 262. In the illustrated embodiment, an insulating cylinder or body 282 is shown positioned between two insulating washers 280. FIG. 9 further illustrates that an electrode lead 284 is coupled to the button electrode 256, connecting the electrode 256 to the detector circuit similar to that provided previously. In one embodiment, the button electrodes 256 are comprised of stainless steel, the insulating washers 280 are fabricated from a Mica sheet and the insulating cylinder 282 comprises Mica or a ceramic material (alumina for example). Screws 266 hold the assembly together.

Figure 10:
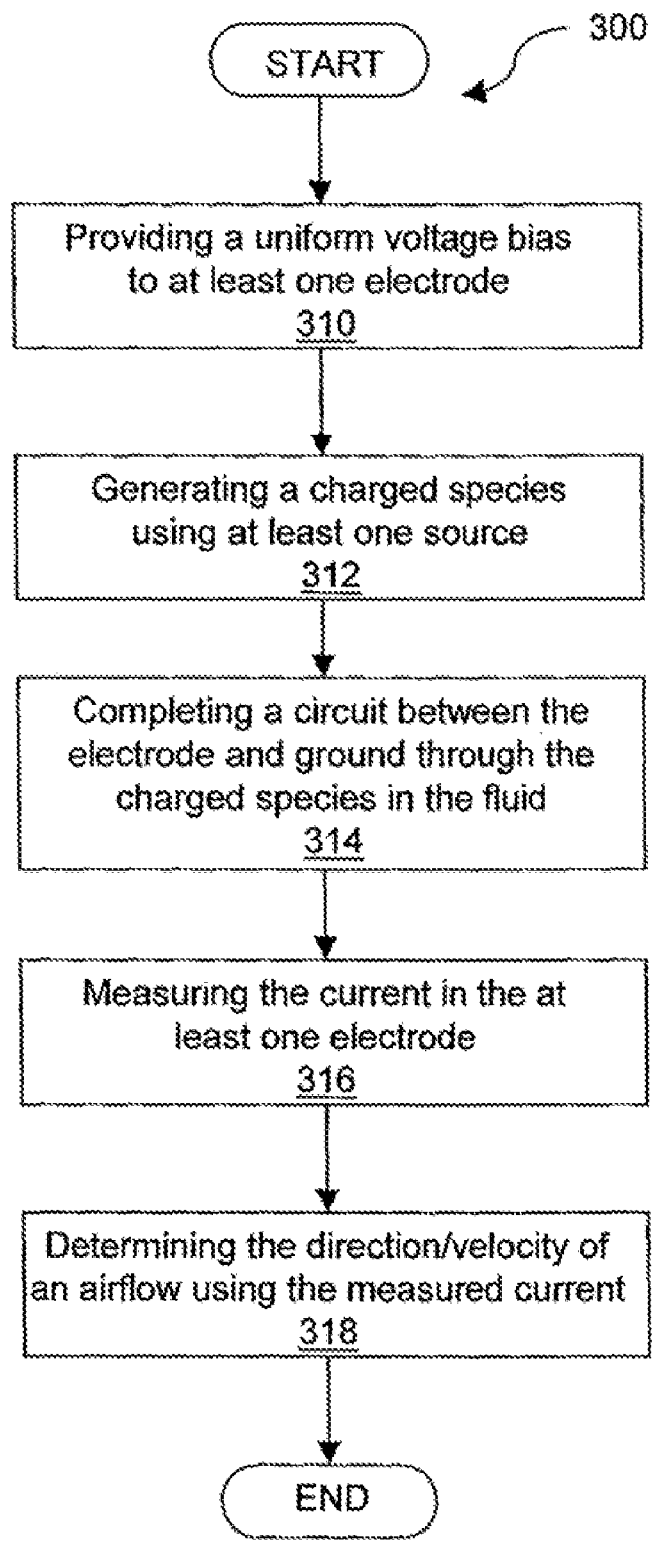
FIG. 10 depicts a flow diagram illustrating a method of detecting and measuring flow in a system using a flow sensor in accordance with features of the one embodiment.

FIG. 10 depicts a flow diagram illustrating a method of detecting and measuring flow in a system, generally designated 300, using one or more embodiments of the multi-directional flow sensor discussed previously. In the illustrated embodiment, the method 300 comprises providing a uniform voltage bias to at least one electrode in the bi-directional flow sensor, designated 310. In at least one embodiment, the uniform voltage bias is provided by a voltage source in one or more detection circuits, similar to the circuit 64 discussed previously.

The method 300 further comprises generating a charged species using a source (an ion or flame source for example), designated 312. Airflow causes the charged species to move in at least one direction. This movement combines with charged species transport due to the electric potential field to complete an electric circuit between one or more electrodes, the source and/or ground, generally designated 314. The one or more detection circuits are used to measure the current passing through the one or more electrodes, generally designated 316. This measured current is used to determine direction and/or velocity of the airflow, generally designated 318. In at least one embodiment, the direction of the airflow is determined by measuring the current that passes through one or more of the electrodes and their position relative to the source. The speed or velocity of the airflow may be determining by comparing the current in a first electrode closer to the source with a second electrode positioned relatively further from the source, for example downstream from the first electrode.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended.

The embodiment of the invention in which an exclusive property or privilege is claimed is defined as follows:

1. An apparatus for real-time monitoring of flow and flow conditions in a system comprising:
   (a) an ion source configured to generate charged species in said flow, where said ion source is driven to a position along a flow axis of said flow by fluid momentum of said flow along said flow axis, where said flow axis is a vector in the direction of flow and passing through said ion source; and
   (b) a multi-directional collection device configured to detect said charged species generated by said ion source, said multi-directional collection device comprised of at least one electrode pair placed on an axis coincident with or parallel to said flow axis, said electrode pair comprised of a set of axially spaced electrodes having a first electrode and a second electrode, wherein said first electrode and said second electrode are electrically isolated from electrical ground, wherein said first electrode and said second electrode are arranged such that during said flow along said flow axis, either said first electrode or said second electrode is downstream of said ion source, and wherein said multi-directional collection device is configured to measure current flow from said first electrode and said second electrode.

2. The apparatus of claim 1, wherein said ion source comprises a burner and a flame, said flame extending from said burner and said burner positioned between said first electrode and said second electrode.

3. The apparatus of claim 1, wherein said multi-directional collection device provides a uniform voltage bias to said first electrode and said second electrode.

4. The apparatus of claim 1, wherein charged species in said flow completes an electrical circuit between said ion source and at least one of said first electrode or said second electrode.

5. The apparatus of claim 4, wherein said multi-directional collection device is comprised of a plurality of electrode pairs placed on a common axis coincident with or parallel to said flow axis, such that during said flow along said flow axis, at least one electrode in the plurality of electrode pairs is downstream of said ion source.

6. The apparatus of claim 5, wherein said multi-directional collection device determines a direction and velocity of said flow along said flow axis by measuring a first current flow from said at least one electrode and comparing said first current flow to a comparison current flow from a comparison electrode, where said comparison electrode is an electrode within said plurality of electrode pairs.

7. The apparatus of claim 6, wherein either said at least one electrode and said comparison electrode are said first electrodes, or said at least one electrode and said comparison electrode are said second electrodes.

8. The apparatus of claim 5, wherein said multi-directional collection device determines a direction and velocity of said flow along a plurality of flow axes, said multi-directional collection device having a multiplicity of said plurality of electrodes pairs placed on a multiplicity of common axes, such that an individual flow axis in said plurality of flow axes has a corresponding common axis in said multiplicity of common axes, where said corresponding common axis is coincident with or parallel to said individual flow axis.

9. An apparatus for real-time monitoring of flow and flow conditions in a system comprising:
   (a) an ion source configured to generate charged species in said flow, where said ion source is driven to a position along a flow axis of said flow by fluid momentum of said flow along said flow axis, where said flow axis is a vector in the direction of flow and passing through said ion source,
   (b) a multi-directional collection device configured to detect charged species, said multi-directional collection device comprised of:
      a plurality of electrode pairs on a common axis coincident with or parallel to said flow axis, wherein said plurality of electrode pairs has a uniform voltage bias, and wherein each electrode pair in the plurality of electrode pairs is comprised of a first electrode and a second electrode,
      wherein said plurality of electrode pairs arranged such that during said flow along said flow axis, either at least one first electrode or at least one second electrode is downstream of said ion source,
      wherein said multi-directional collection device is further configured to measure a multiplicity of individual current flows, where said multiplicity of individual current flows is comprised of individual currents from said first electrodes and said second electrodes, such that the multi-directional collection device determines a direction and velocity of said flow along said flow axis by comparison of said individual current flows comprising the multiplicity of individual current flows.

10. The apparatus of claim 9, wherein said multi-directional collection device determines a direction and velocity of said flow along a plurality of flow axes, said multi-directional collection device having a multiplicity of said plurality of electrodes pairs placed on a multiplicity of common axes, such that an individual flow axis in said plurality of flow axes has a corresponding common axis in said multiplicity of common axes, where said corresponding common axis is coincident with or parallel to said individual flow axis.

11. The apparatus of claim 9, wherein said ion source comprises a burner and a flame, said flame extending from said burner and said burner positioned between said first electrodes and said second electrodes.

12. The apparatus of claim 9, wherein said ion source comprises a burner and a flame, said flame extending from said burner and said burner positioned between said first electrodes and said second electrodes, and wherein said multi-directional collection device determines a direction and velocity of said flow along a plurality of flow axes, said multi-directional collection device having a multiplicity of said plurality of electrodes pairs placed on a multiplicity of common axes, such that an individual flow axis in said plurality of flow axes has a corresponding common axis in said multiplicity of common axes, where said corresponding common axis is coincident with or parallel to said individual flow axis.

* * * * *